March 30, 1954
B. KUNKEL
2,673,589
SPRING SUPPORTED SEAT FOR GOLF BAG CARRIERS
Filed Jan. 30, 1951
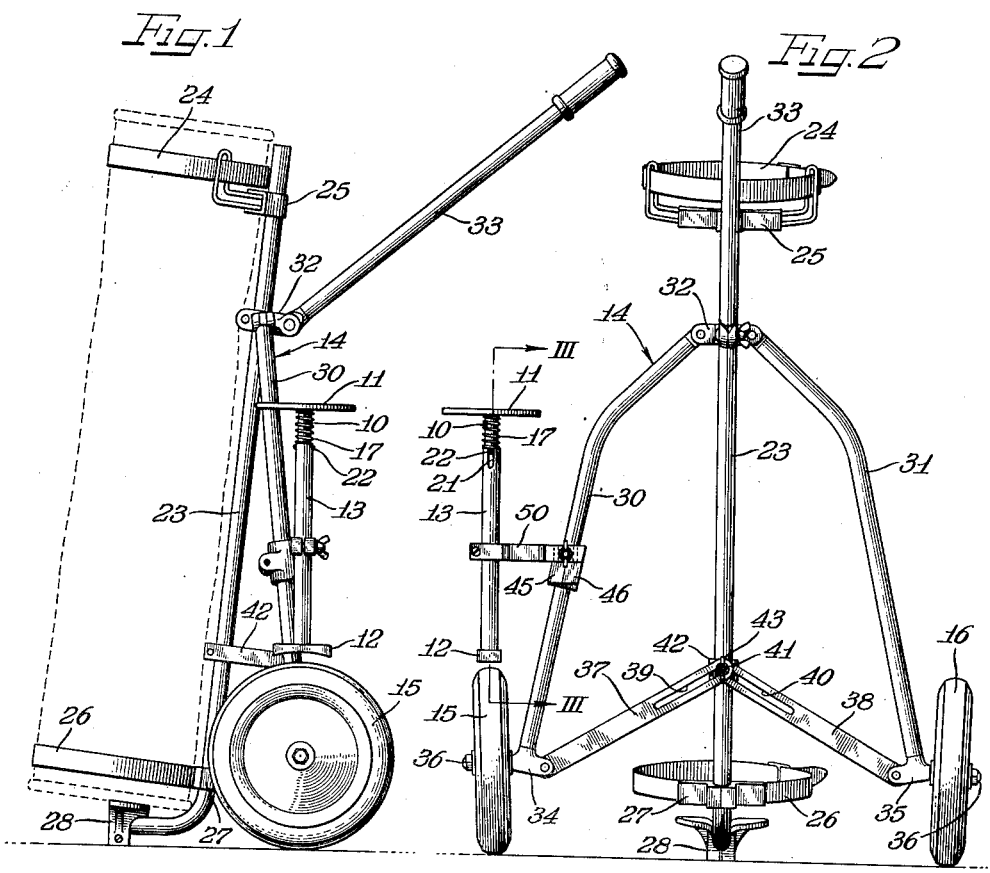
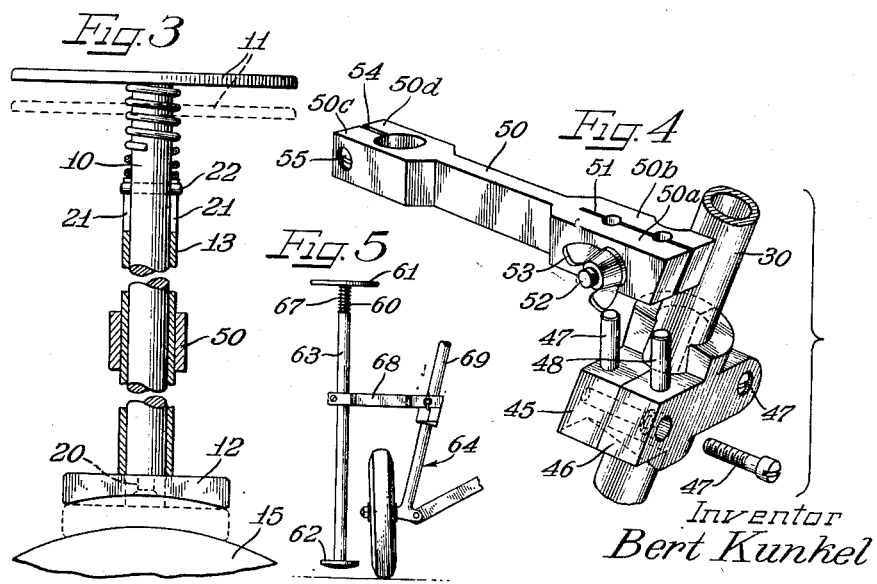
Inventor
Bert Kunkel
by Hill, Sherman, Meroni, Gross & Simpson Attys Patented Mar. 30, 1954

2,673,589

UNITED STATES PATENT OFFICE 2,673,589

SPRING SUPPORTED SEAT FOR GOLF BAG CARRIERS

Bert Kunkel, Chicago, Ill.

Application January 30, 1951, Serial No. 208,612

6 Claims. (Cl. 155—5)

This invention relates to seats, and more particularly to seats for movable vehicles.

An important problem is presented in providing seats for wheeled vehicles in that the vehicles are movable and do not provide a secure support for a person sitting thereon.

Another problem is presented in providing seats for vehicles such as golf carts in that the vehicle is often light in construction and not strong enough to safely support the weight of a person sitting on a seat thereon.

Accordingly, one object of this invention is to provide an improved structure for a vehicle in which means are connected to a vehicle seat for preventing movement of the vehicle when a person sits on the seat.

Another object of this invention is to provide a seat structure for a wheeled vehicle movable on a supporting surface in which the weight of a person sitting on the seat is principally borne directly from the supporting surface through the seat structure or from the supporting surface through a wheel and through the seat structure.

A further object of this invention is to provide an improved structure for a wheeled vehicle in which a seat is connected to wheel braking means operated when a person sits on the seat.

Still another object of this invention is to provide an improved structure for a vehicle movable on a supporting surface in which a seat is connected to braking means engageable with the supporting surface when a person sits on the seat.

A still further object of this invention is to provide improved means for detachably securing seat structures to a vehicle.

A feature of this invention is in the provision of a vertical sleeve supported from a wheeled vehicle, a shaft slidable in the sleeve and having a seat structure at its upper end and a brake member at its lower end engageable with the upper peripheral portion of a vehicle wheel when the seat is moved downwardly by the weight of a person thereon so that motion of the vehicle will be impeded and so that the weight of the person will be borne principally by the wheel and seat structure.

Another feature of this invention is in the provision of a vertical sleeve supported from a vehicle movable on a supporting surface, a shaft slidable in the sleeve and having a seat structure at its upper end and a ground-engaging member at its lower end, and spring means urging the shaft and seat upwardly, the member being engageable with the supporting surface when the seat is moved downwardly by the weight of a person thereon so that motion of the vehicle will be impeded and so that the weight of the person will be borne principally from the supporting surface through the seat.

Other objects, features and advantages of the present invention will be readily apparent from the following detailed description of certain preferred embodiments thereon taken in conjunction with the accompanying drawings, in which:

Figure 1 is a side elevational view of the seat structure constructed according to this invention attached to a golf cart;

Figure 2 is a front elevational view of the seat and golf cart of Figure 1;

Figure 3 is a detail view, on an enlarged scale, of the seat structure of Figure 1, certain parts being shown in section for clarity;

Figure 4 is a detail view, on an enlarged scale, of the structure for attaching the seat of Figure 1 to a frame member of the golf cart; and Figure 5 is a front elevational view of a modified structure.

Referring to Figures 1 to 4, a preferred structure is shown in which a shaft 10 having a seat 11 affixed to the upper end thereof and a brake member 12 affixed to the lower end thereof is supported and guided for vertical movement in a vertical sleeve 13 which is, in turn, detachably supported from a golf cart, generally designated by reference numeral 14, having a pair of wheels 15 and 16.

The shaft 10 is aligned with the upper peripheral portion of the wheel 15 so that the brake member 12 is engageable therewith. The shaft is, however, normally biased to an upper position in which the brake member 12 is spaced from the periphery of the wheel 15 by means of a helical compression spring 17 encircling the shaft 10 between the upper end of sleeve 13 and the seat 11.

The seat 11 may be affixed to the upper end of the shaft 10 in any desired manner and may, if desired, be integral therewith. The brake member 12 is preferably, for ready assembly of the structure, detachably secured to the lower end of the shaft 10 by means of a screw 20 extending through the brake member 12 and threaded into the lower end of the shaft 10.

The brake member 12 preferably has a concave arcuate lower surface complementary to the peripheral surface of the wheel 15 to provide a maximum braking area. In order to prevent rotation of brake member 12 about the axis of sleeve 13, the sleeve has a pair of diametrically opposite longitudinally extending slots 21 in the upper end portion thereof, and a pin 22 extending through the shaft 10 and affixed thereto has its end portions disposed in the slots 21.

It will be readily seen that the weight of a person sitting on the seat 11 will force the shaft 10 downwardly against the action of compression spring 17 to engage the brake member with the periphery of the wheel 15 and prevent rotation of the wheel and motion of the cart. It may also be noted that the weight of the person is borne principally by the wheel 15, the remaining cart structure acting only to provide a steadying action.

The golf cart 14 illustrated includes a central frame member 23 having an upper golf bag encircling strap 24 connected to an upper portion thereof by an attachment 25 and a lower golf bag encircling strap 26 connected to a lower portion thereof by an attachment 27. The central frame member 23 is bent rearwardly at its lower end portion and a member 28 is disposed on the lower end thereof to provide a support for the lower end of a golf bag and to engage the ground and steady the cart when not in motion. It will be seen that a golf bag can be readily secured in position as indicated in dotted lines in Figure 1.

A pair of outer frame members 30 and 31 are pivotally connected at their upper ends to a connector 32 secured to an upper portion of the central frame member 23. A cart-pulling or cart-pushing handle 33 is adjustably pivotally attached to the connector 32. A pair of members 34 and 35 are secured to the lower ends of outer frame members 30 and 31, respectively, and each has an axle or spindle portion on which the wheels 15 and 16, respectively, are rotatably disposed, the wheels being held thereon by means of nuts 36.

A pair of links 37 and 38 are pivotally secured to members 34 and 35, respectively, and have longitudinally extending slots 39 and 40, respectively, into which extends a screw 41 fixed to a member 42 extending forwardly from the central frame member 23. A wing nut 43 is threaded on screw 23 to secure the links 37 and 38 in place, the slots 39 and 40 in the links 37 and 38, respectively, permitting the relative position of the wheels 15 and 16 to be adjusted and permitting the outer frame members 30 and 31 to be folded in to reduce the width of the cart when the cart is to be stored.

In order to detachably support the sleeve 13 of the seat structure from the cart, a pair of opposed members 45 and 46 are disposed on opposite sides of the outer frame member 30, the members having facing recesses therein defining a generally cylindrical opening through which the frame member 30 extends. Screws 47 extend through member 46 on opposite sides of frame member 30 and are threaded into member 45 to draw the members together and tightly clamp the frame member 30 therebetween.

A pair of pins 47 and 48 extend upwardly from the members 45 and 46, respectively. A horizontal outwardly extending bar 50 has a slot 51 extending longitudinally from the inner end thereof to provide a pair of end portions 50a and 50b, the facing surfaces of which have recesses therein defining generally cylindrical openings into which the pins 47 and 48 may extend. A threaded member 52 is secured to the portion 50b and extends through the portion 50a, a wing nut 53 being threaded on the threaded member 52 to draw the portions 50a and 50b together and clamp the pins 47 and 48 therebetween.

The bar 50 can thus be readily attached to the outer frame member 30 and, at the same time, is substantially rigid, when attached, against relative movements in any direction or angularly with respect to the frame member 30, this attachment structure being particularly advantageous in supporting seat structure on a vehicle since the structure must be maintained in position against the action of shocks and vibrations resulting from the movement of the vehicle over rough terrain.

A slot 54 extends longitudinally from the outer end of bar 50 and provides two end portions 50c and 50d, the slot inwardly terminating at a generally cylindrical opening through which the sleeve 13 of the seat structure extends. A screw 55 extends through end portion 50c and is threaded into end portion 50d to draw the portions together and tightly clamp the sleeve therebetween.

It is thus seen that the seat structure of Figures 1 to 4 is simple, easily and economically manufactured and assembled, can be readily securely attached to a vehicle, provides braking means on the vehicle wheel, and permits the weight of a person sitting thereon to be principally borne by the vehicle wheel.

Due to the diverging angle of the frame member 30, upward or downward movement of the opposed clamp member 45—46 acts to not only vertically but laterally adjust the position of the tube 13 and seat assembly carried thereby.

A modified seat structure is illustrated in Figure 5. In this structure a shaft 60 having a seat 61 at its upper end and a ground-engaging brake and support member 62 at its lower end is vertically slidable in a vertical sleeve 63 supported from a cart generally designated by reference numeral 64. A helical compression spring 67 encircles the shaft 60 between the upper end of the sleeve 63 and the seat 61.

The seat 61, when a person sits thereon, is thus moved downwardly against the action of compression spring 67 to engage the member 62 with the ground to prevent the cart from moving. It will also be noted that the weight of the person is principally borne from the ground through the member 62, shaft 60 and seat 61, the cart providing only a steadying action.

The sleeve 63 of the seat structure of Figure 5 is supported by a bar 68 secured at its outer end to the sleeve and detachably secured at its inner end to a frame member 69 of the vehicle 64 by means similar to that used to support bar 50 from frame member 30 illustrated in Figure 4 and described above.

It will be understood that modifications and variations may be effected without departing from the spirit and scope of the novel concepts of the present invention.

I claim as my invention:

1. A seat structure for a wheeled vehicle, comprising, a vertical sleeve, means for attaching said sleeve to the vehicle, a shaft vertically slidable in said sleeve, a seat secured to said shaft, spring means urging said shaft and said seat upwardly, and a brake member affixed to said shaft and engageable with a wheel of said vehicle upon downward movement of said seat.

2. A seat structure for a wheeled vehicle, comprising, a seat, means for supporting said seat from the vehicle for vertical movement, resilient means urging said seat upwardly, and a brake member connected to said seat and frictionally engageable with a vehicle wheel upon downward movement of said seat against the action of said resilient means.

3. A seat structure for a vehicle, comprising, a pair of pins, means for securing said pins from the vehicle in spaced upwardly projecting positions, a bar having a pair of end portions having spaced facing surfaces, said facing surfaces having recesses therein defining generally cylindrical openings through which said pins extend, means for drawing said pair of end portions together to clamp said pins therebetween, a vertical sleeve secured to said bar, a shaft movable in said sleeve, a seat affixed to said shaft, resilient means urging said shaft and seat upwardly, and braking means connected to said shaft and operable upon downward movement of said seat.

4. In a wheeled vehicle, a seat structure comprising: a seat, means supporting said seat from the vehicle in a weight-receiving operative position over a vehicle wheel, and a brake member disposed intermediate said wheel and said seat in said operative position of said seat, said brake member being frictionally engaged with said wheel upon application of weight to said seat to support said weight through said wheel and prevent movement of said wheel.

5. A seat structure for a wheeled vehicle, comprising: a seat, a brake member connected to said seat, and means for supporting said seat and said brake member from a vehicle with said brake member over a vehicle wheel and arranged to frictionally engage a wheel upon application of weight to said seat.

6. An ambulatory golf bag cart having a frame including an elongated upwardly ranging central frame member, golf bag connecting means on said central frame member for attaching the golf bag thereto, the lower end portion of said central frame member being formed with a horizontal member to provide a support for the lower end of a golf bag and a vertical downward projection to further provide a steady rest for engaging a supporting surface when the cart is stationary, said frame including secondary frame means connected to said central frame member and having spaced rotatable wheels carried thereby for engaging the supporting surface, said wheels being spaced with respect to and cooperating with said steady rest to transmit vertical forces acting on said frame to the supporting surface, a seat, and connecting means between said frame and said seat including support means formed to provide vertical force transmitting means to transmit forces between the seat and the supporting surface independently of said frame, thereby to carry weight on said seat without strain on said frame, said support means comprising a seat supporting leg means engaging and resting on the top of one of said wheels when the seat is in use, the seat and said leg means being movable to an inoperative position away from the wheel to free said one wheel when the seat is not in use, and means for holding said seat and said leg means in inoperative position.

BERT KUNKEL.

References Cited in the file of this patent
UNITED STATES PATENTS

| Number | Name | Date |
| --- | --- | --- |
| 1,025,519 | Dormandy | May 7, 1912 |
| 1,688,415 | Fox | Oct. 23, 1928 |
| 2,359,284 | Benbow | Oct. 3, 1944 |
| 2,438,078 | Sutphen | Mar. 16, 1948 |
| 2,438,829 | Skolnik | Mar. 30, 1948 |
| 2,590,382 | Danielson | Mar. 25, 1952 |

FOREIGN PATENTS

| Number | Country | Date |
| --- | --- | --- |
| 14,602 | Great Britain | 1898 |